Nov. 14, 1944.  R. C. S. JAMIE  2,362,901
CLIP FOR HOSE AND THE LIKE
Filed Feb. 25, 1943
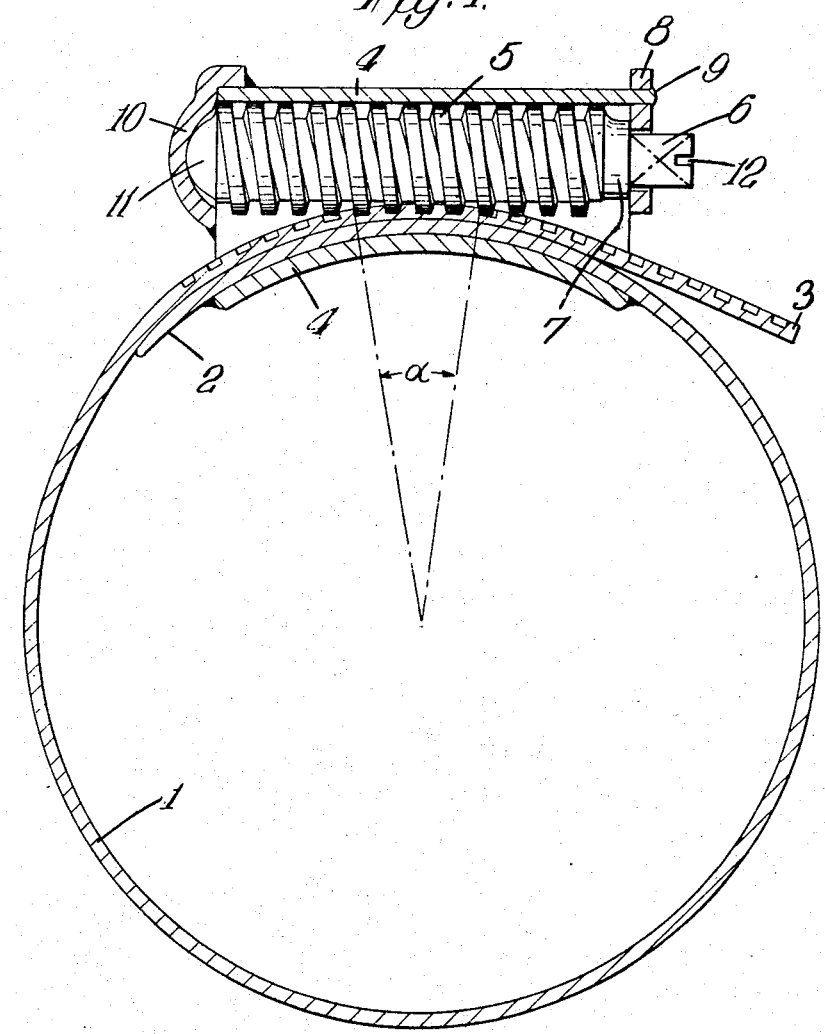
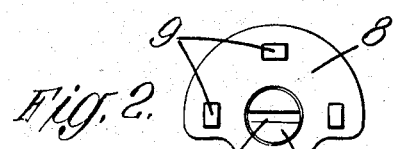
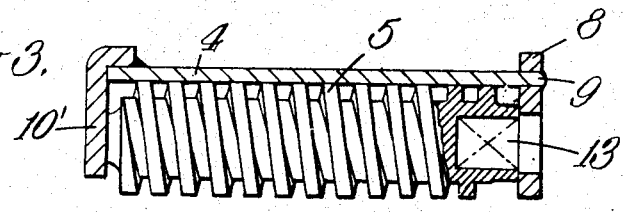
INVENTOR:
Robert Cuthbert Scott Jamie
By (signature)
his ATTY.

Patented Nov. 14, 1944

2,362,901

UNITED STATES PATENT OFFICE 2,362,901

CLIP FOR HOSES AND THE LIKE

Robert Cuthbert Scott Jamie, Pathlow, near Stratford-on-Avon, England

Application February 25, 1943, Serial No. 477,063
In Great Britain August 19, 1942

7 Claims. (Cl. 24—19)

This invention relates to clips for hoses and the like and whilst the clips are especially applicable for connecting flexible tubular members to rigid tubular members, as for example in the water circulating systems of water cooled engines such as are used on motor cars, the clips are also applicable in any case where the end of flexible tubing is adapted to be connected to a rigid tube or tubular member or where a clip is to be tightened around an article.

The present invention relates to clips of the type comprising a metal band of which the ends overlap, the outer overlapping end being provided with slots, or their equivalent for engagement by a screw rotatably mounted in a housing secured to the other overlapping end and having means for the rotation thereof.

In known clips of this type a shoulder is formed at the operating end of the screw, the shoulder being formed by a head or collar which is of larger diameter than the screw. This construction has the disadvantage that when the diameter of the clip is increased beyond a predetermined amount the radius of curvature of the band is increased so that the outer overlapping end of the clip approaches the head of the screw and freely comes into contact with the sharp edge of the shoulder, as a result of which the slots or their equivalent in the outer overlapping end are cut or damaged by the shoulder both during the tightening and the slackening of the clip.

The shoulder also serves to take the thrust when tightening the clip and as the difference in diameter between the head and the screw is considerably restricted for the reasons set out above, that is to say the free end of band must normally not come into contact with the head, the area of the shoulder available for taking the thrust, when tightening and which may be considerable, is very small. As a result a very high intensity of pressure is applied to the shoulder and the friction on this shoulder is considerable since in practice the radial width of the shoulder cannot be much greater than the thickness of thin sheet metal.

As the diameter of the head is thus limited in this known type of clip the diameter of the screw is correspondingly limited.

The slots in the band are formed by a cutter which can only be produced down to a definite minimum diameter for commercial purposes and in order to effect a reasonable number of cuts. Attempts have been made to reduce the diameter of the cutter to that of the screw but this has only been achieved at the expense of production. As in the known clips the cutter is of different diameter to the screw the latter when engaging with the slots in the band cuts into these or otherwise damages them so that considerable friction is set up.

In the known type of clip a washer, bearing against the opposite end of the housing is located at the opposite end of the screw for taking the thrust when slackening the clip.

It is the object of the present invention to provide an improved form of clip which obviates the above disadvantages and wherein the screw engages accurately with the slots or the like in the band, whilst the screw is retained in the housing by end plates or the like abutments of the housing.

According to the present invention a clip of the type described is provided with a screw or worm of which the end, provided with means for its manipulation, has a shoulder which bears against a plate or washer, or like abutment secured to or forming part of the adjacent end of the housing, for taking up the thrust when slackening the clip.

The opposite end of the screw or worm preferably bears against a cap or plate or like abutment secured to or forming part of the corresponding end of the housing, for taking up the thrust when tightening the clip.

According to another aspect of the invention a clip of the type described is provided with a screw or worm which at its rear end bears against a cap or plate or like abutment secured to or forming part of the rear end of the housing, for taking up thrusts when tightening the clip, whilst the front end of the screw bears against a plate or washer or like abutment secured to or forming part of the housing for taking up thrusts when slackening the clip, the worm or screw being provided at one end with means for the manipulation thereof.

The plate or washer at the front end of the housing is preferably secured in position by means of projections on the housing which pass through holes in the plate or washer and are then riveted over.

This plate or washer may be provided with a central hole through which passes an operating head of smaller size than the screw or worm and extending therefrom.

The plate or cap at the rear end of the housing may be domed or flat and is secured in position, preferably by spot welding. The housing and the end plates or the like may also be formed as an integral casting.

The rear end of the worm or screw is preferably of the same shape as the rear plate or cap so as to obtain a large arc of contact between the end of the screw or worm and the plate or cap to take the thrust when tightening the clip.

The invention will now be described by way of example with reference to the accompanying drawing, wherein:

Figure 1 shows a side view of a clip partly in section.

Figure 2 shows an end view of the right hand end of a housing, and

Figure 3 shows in section a modification of the left hand end of a housing.

As shown in Figure 1, the clip consists of a band of metal 1 with overlapping ends 2, 3. The overlapping end 3 and the portion of the band 1 passing through a housing 4 is provided with transversely arranged slots or their equivalent for engagement by a worm or screw 5 of which the thread may be square as shown or of other suitable shape provided with a flat periphery.

The thread of the screw 5 engages with the overlapping end 3 of the band 1 over an angle α.

The screw 5 is a tight fit in the housing 4 which latter forms a bearing for the screw 5 and serves to bed the screw 5 in the slots of the band 3. In this manner effective engagement between the thread of the screw 5 and the slots in the band 3 is obtained.

The diameter of the screw 5 is approximately the same as that of a cutter used for cutting the slots in the band 3 as a result of which liability of cutting or otherwise damaging the slots by the screw 5 is avoided, thus increasing the life of the band 3 and consequently of the clip. This arrangement also serves to reduce friction when turning the screw.

At its right hand or front end the screw 5 is provided with a head 6 which is of smaller diameter than the screw 5. As the head 6 is of smaller diameter than the screw 5, the head 6 is not liable to contact with the overlapping end 3, so that there is no possibility of the slots in the overlapping end 3 being damaged or cut by the head 6.

The shoulder 7 formed between the screw 5 and the head 6 bears against a plate or washer 8 which is secured in position by projections 9, provided at the end of the housing 4, which pass through corresponding holes in the washer 8 and are then riveted over. The head 6 passes through a suitable hole in the washer 8.

To the left hand end of the housing 4 is secured, for example by spot welding, a domed cap 10 against which bears the domed end 11 of the screw 5.

The curvature of the dome 11 is the same as that of the cap 10 so as to provide a large area of contact between the two abutting surfaces.

With the arrangement as above described there is obtained a satisfactory thrust arrangement as the front end of the screw 5 bears against the washer 8 and the rear end against the cap 10.

When the clip 1 is tightened the reaction on the screw 5 is in a direction from right to left in Figure 1. When the clip is slackened the thrust, which in comparison with the thrust when tightening and is in the opposite direction thereto, is light and can be taken up adequately by the washer 8 so that this can be secured in position as described.

By the use of a screw 5 of larger diameter than the head 6, there is also obtained the advantage that a screw of larger diameter can be used than when the head is larger than the screw. With a large screw the thread and also the clip may be made stronger than is normally the case with a smaller screw. Further the angle of engagement between the screw and the slots in the clip is larger than when a smaller screw is used.

In the modification shown in Figure 3 a flat plate 10' is secured to the left hand end of the housing 4 for taking the thrust of the screw 5 when the clip 1 is tightened. In this case the screw 5 is provided with a flat rear end whilst the right hand end of the screw 5 may be provided with a square hole 13 for engagement with a tool of corresponding shape.

The head 6 (Figure 1) of the screw 5 is provided with a slot 12 for engagement of a suitable tool or implement. The head may, however, be of circular, square or hexagonal cross section or may be provided with flats for engagement by a suitable tool. It is even possible to provide a slot in the front end of the screw or worm, for engagement by a tool or other implement, to which access is obtained through the hole in the washer 8.

The housing 4 and the end plates, 8, 10 may be formed as an integral casting.

I claim:

1. In a clip for tightening a circular metal band having an underlapping end and a transversely slotted overlapping end, the combination comprising a housing, a plate secured to the front end of said housing, a cap secured to the rear end of said housing, and a worm rotatably mounted in said housing between said plate and said cap, said worm having an annular bearing surface bearing against said plate.

2. In a clip for tightening a circular metal band having an underlapping end and a transversely slotted overlapping end, the combination comprising a housing, a plate secured to the front end of said housing, a cap secured to the rear end of said housing, a worm rotatably mounted in said housing between said plate and said cap, and a shoulder at the front end of said worm, said shoulder bearing against said plate.

3. A clip, as claimed in claim 1, wherein projections are provided at the front end of said housing and said plate has holes therein, said projections passing through said holes and being riveted over.

4. A clip, as claimed in claim 1, wherein said plate is provided with a central hole therein, and said worm has an operating head of smaller diameter than said worm and projecting through said central opening.

5. A clip, as claimed in claim 1, wherein said cap is domed, the rear end of said worm being correspondingly shaped.

6. A clip, as claimed in claim 1, wherein said cap is flat, the rear end of said worm being correspondingly shaped.

7. A clip, as claimed in claim 1, wherein the cap is secured to the housing by spot welding.

ROBERT CUTHBERT SCOTT JAMIE.